United States Patent
Hruschka et al.

(10) Patent No.: US 11,028,236 B2
(45) Date of Patent: Jun. 8, 2021

(54) METHOD FOR PROCESSING DANDELION PLANT COMPONENTS

(71) Applicant: GEA Mechanical Equipment GmbH, Oelde (DE)

(72) Inventors: Steffen Hruschka, Oelde (DE); Luis Peixoto, Oelde (DE); Alexander Rossmeisl, Selb-Ploessberg (DE); Frans Kappen, Helsum (NL); Richard Op Den Kamp, Driel (NL)

(73) Assignee: GEA Mechanical Equipment GmbH, Oelde (DE)

( * ) Notice: Subject to any disclaimer, the term of this patent is extended or adjusted under 35 U.S.C. 154(b) by 0 days.

(21) Appl. No.: 16/328,206

(22) PCT Filed: Aug. 9, 2017

(86) PCT No.: PCT/EP2017/070239
§ 371 (c)(1),
(2) Date: Feb. 25, 2019

(87) PCT Pub. No.: WO2018/036825
PCT Pub. Date: Mar. 1, 2018

(65) Prior Publication Data
US 2019/0233595 A1    Aug. 1, 2019

(30) Foreign Application Priority Data

Aug. 26, 2016  (DE) .................... 10 2016 115 894.1

(51) Int. Cl.
*C08H 8/00* (2010.01)
*C08B 37/00* (2006.01)
(Continued)

(52) U.S. Cl.
CPC ........... *C08H 8/00* (2013.01); *C08B 37/0003* (2013.01); *C08B 37/0054* (2013.01); *C08C 1/00* (2013.01); *C08C 1/04* (2013.01); *C08C 1/075* (2013.01)

(58) Field of Classification Search
CPC .................................. C08H 8/00; C08C 1/04
See application file for complete search history.

(56) References Cited

U.S. PATENT DOCUMENTS 2,399,156 A    4/1946  Stamberger et al.
4,136,131 A  * 1/1979  Buchanan ................. C08C 4/00
                                                          524/926
(Continued)

OTHER PUBLICATIONS

International Search Report (PCT/ISA/210) issued in PCT Application No. PCT/EP2017/070239 dated Sep. 21, 2017 with English translation (five pages).
(Continued)

*Primary Examiner* — Liam J Heincer
(74) *Attorney, Agent, or Firm* — Crowell & Moring LLP

(57) ABSTRACT

The invention relates to a method for processing dandelion plant components, particularly dandelion plant components of the *Taraxacum kok-saghyz* variety, in which, according to the method, rubber is obtained as a first valuable product, said method being characterised by the following steps: A) grinding and/or squeezing the dandelion plant components, preferably while adding water to form a pulp; and B) first separation of the pulp into at least one phase 80 which is high in inulin and low in rubber and at least one phase 90 which is high in rubber and low in inulin, the phase 90 which is high in rubber and low in inulin forming the first valuable product or the first valuable product being obtained from the phase which is high in rubber and low in inulin.

26 Claims, 4 Drawing Sheets

(51) Int. Cl.
*C08C 1/04* (2006.01)
*C08C 1/075* (2006.01)
*C08C 1/00* (2006.01)

(56) References Cited

U.S. PATENT DOCUMENTS

| | | | | |
|---|---|---|---|---|
| 5,580,942 | A * | 12/1996 | Cornish | C08C 1/04 |
| | | | | 521/42 |
| 9,346,924 | B2 | 5/2016 | Wade et al. | |
| 10,471,473 | B2 * | 11/2019 | Huang | B02C 23/08 |
| 2006/0149015 | A1 * | 7/2006 | Cornish | C08C 1/075 |
| | | | | 528/1 |
| 2011/0054051 | A1 * | 3/2011 | Cole | C08C 3/00 |
| | | | | 521/43.5 |
| 2011/0275142 | A1 * | 11/2011 | Wade | C08B 37/0054 |
| | | | | 435/274 |
| 2012/0041188 | A1 * | 2/2012 | Laufenberg | C08B 37/0054 |
| | | | | 536/123.1 |
| 2015/0073113 | A1 * | 3/2015 | Huang | C08C 3/02 |
| | | | | 526/335 |
| 2015/0126673 | A1 * | 5/2015 | Randall | C08C 1/04 |
| | | | | 524/526 |
| 2015/0136882 | A1 * | 5/2015 | Huang | B02C 13/04 |
| | | | | 241/20 |
| 2017/0073479 | A1 * | 3/2017 | Kiridena | G01N 33/445 |
| 2019/0048101 | A1 * | 2/2019 | Nocera, Jr. | B01D 15/26 |

OTHER PUBLICATIONS

German-language Written Opinion (PCT/ISA/237) issued in PCT Application No. PCT/EP2017/070239 dated Sep. 21, 2017 with English translation (10 pages).

German-language Search Report issued in counterpart German Application No. 10 2016 115 894.1 dated Mar. 27, 2017 with partial English translation (14 pages).

Buranov et al., "Extraction and Characterization of Latex and Natural Rubber from Rubber-Bearing Plants", Journal of Agricultural and Food Chemistry Article, Jan. 27, 2010, pp. 734-743, vol. 58, No. 2, XP055406189 (10 pages total).

"Inulin—Versionsunterschied", Wikipedia, Jul. 7, 2016 (three pages total).

Kern, "Förderbeispiel Latex aus Löwenzahn" [funding example of latex from dandelion], 2011, 10 pages total.

Beilen, "Alternative Sources of Natural Rubber", Outputs from the EPOBIO project. Nov. 2006, vol. 27, CPL Press Science Publishers et al., 64 pages total.

Schmidt et al., "Characterization of rubber particles and rubber chain elongation in Taraxacum koksaghyz", BMC Biochemistry, 2010, vol. 11, 11 pages total.

* cited by examiner

METHOD FOR PROCESSING DANDELION PLANT COMPONENTS

The present invention relates to a method for processing dandelion plant components, more particularly dandelion plant components of the species *Taraxacum kok-saghyz*, wherein obtaining of an elastomer, more particularly a rubber, as a first valuable product is achieved in the method.

In the context of the present invention, rubber is to be understood to mean in particular the so-called dandelion rubber, as has already been described in numerous publications, including in Kern, Timo: Förderbeispiel Latex aus Löwenzahn [funding example of latex from dandelion]. Ed.: biotechnologie.de. 2011; in van Beilen J B, Poirier Y: Guayule and Russian Dandelion as Alternative Sources of Natural Rubber. In: Crit. Rev. Biotechnol. Volume 27, 2007; and in T. Schmidt. M. Lenders, A. Hillebrand, N. van Deenen. O. Munt, R. Reichelt, W. Eisenreich, R. Fischer, D. Pritfer, C. S. Gronover: Characterization of rubber particles and rubber chain elongation in *Taraxacum koksaghyz*. In: BMC biochemistry. Volume 11, 2010, page 11. For instance, Russian dandelion provides 1 milliliter of rubber per plant. Moreover, the short life cycle of from six to eight months and the option of tissue cultures offers additional advantages over other potential rubber providers. The rubber particles obtained from Russian dandelion are very similar to those from *Hevea brasiliensis*. They contain highly pure poly(cis-1,4-isoprene) having a high molecular mass.

The obtaining of rubber from Russian dandelion and the processing thereof, for example to form tires, is a topic which is already known per se and which has been revisited more recently.

U.S. Pat. No. 2,399,156 A discloses a method for obtaining rubber. Said rubber can be obtained from plant components of Russian dandelion. In the method, the dandelion is treated with a hot alkali metal hydroxide and a water-insoluble fatty acid is added for the saponification of the hydroxides. Then, the rubber obtained is washed and dried. Said method aims exclusively at the obtaining of rubber and has turned out to be unviable owing to, inter alia, the use of chemicals and the disposal costs which arise.

U.S. Pat. No. 9,346,924 B2 discloses a method for obtaining rubber and an inulin-containing phase. In the method, the plant fibers are degraded through the use of cellulase and/or hemicellulase enzymes. To create optimal conditions for the enzyme increase, the solution is held at 40-70° C. A biological disruption is involved. However, the use of enzymes has multiple disadvantages. Firstly, the use of enzymes is costly and time-consuming. Secondly, the biological contamination of the inulin-containing aqueous phase is very high. Wastewater which arises must therefore be disposed of separately as appropriate.

Proceeding from this prior art, it is now an object of the present invention to provide a method which promises a higher profitability.

This object is achieved by a method having the features of claim 1.

The method according to the invention deals with the processing of dandelion plant components, more particularly dandelion plant components of the species *Taraxacum kok-saghyz*.

By means of the method, rubber is obtained as a first valuable product. This can be crude rubber or a purified rubber. The term "rubber" encompasses in particular the so-called dandelion rubber.

Unlike U.S. Pat. No. 9,346,924 B2, the degradation is done especially with avoidance of a biological degradation of plant components by enzymes. The process temperature is selected accordingly.

The method comprises at least the following steps:

A) comminution and/or squeezing of the dandelion plant components, preferably with addition of water, to form a slurry;

The comminution or squeezing of the dandelion plant components can preferably be done with addition of additional water. The comminution and/or squeezing can, likewise preferably, be divided into multiple steps. The slurry formed is preferably a suspension composed of water in which solids of the comminuted dandelion plant components are present in a suspended state.

The dandelion components used for processing in accordance with the method according to the invention can be the entire plant or, particularly preferably, just the root and the hypocotyl, i.e., the lowest part of the plant stem. By means of prior treatment, it can be cleaned of sand and other surface-adherent substances, such as, for example, soil or clay.

After the formation of the slurry, what may occur owing to enzymes in the dandelion is a fermentation in which further valuable products such as inulin and fructose are degraded. To ideally prevent this, the processing in the following steps can be done very rapidly. Furthermore, measures can be taken to slow down the fermentation.

The slurry formed can have a preferred dilution ratio of 1 part root to 10-20 parts water.

Following the formation of the slurry, it is further processed in step B), which is described below.

B) First separation of the slurry into at least one high-inulin low-rubber phase and at least one high-rubber low-inulin phase, wherein the high-rubber low-inulin phase forms the first valuable product or the first valuable product is obtained from the high-rubber low-inulin phase;

The separation of the slurry can, for example, be done by sieving, filtration and/or, particularly preferably, by centrifugal separation. In this connection, the separation can be done in one step into three phases (rubber, water and inulin phase) or be done in two steps by removing water either first with the rubber or, alternatively, first with the inulin phase or else with distribution in both phases, i.e., the rubber and inulin phase. If a rubber-water phase is separated from an inulin phase, the rubber can be sieved from the water as pellets. If an inulin-water phase is separated from the rubber phase, the separation between the water phase and the inulin phase can be done by centrifugation, as coldly and quickly as possible in order to avoid an enzymatic degradation of the inulin to form fructose. The thus aforementioned inulin phase may still contain 5-15% by weight of water even after removal of the water phase. Moreover, the aforementioned inulin phase comprises approx. 10% dry matter content.

Thus, rubber as first valuable product can be utilized directly after the separation in terms of the high-rubber low-inulin phase. In the context of the present invention, such rubber is also called "crude rubber". However, it is advantageous to further purify said crude rubber, for example by washing with or without heating, preferably to a temperature between 70 to 100° C. As an addition or as an alternative, it is possible in this step of the method to use enzymes which degrade contaminants, for example cellulase, pectinase. What is thus produced is purified rubber, which can likewise be the first valuable product.

In itself, the obtaining of rubber from dandelion is already known. However, said rubber is not obtained by gentle squeezing, but by temperature treatment. In this connection, inulin present in plants is converted to form fructose. A substantially better, in particular economical, procedure arises when inulin is ideally not converted into fructose before the rubber separation.

Further advantageous embodiments of the invention are subject matter of the dependent claims.

C) Heating of the high-inulin low-rubber phase to a temperature at which at least some inulin is converted into fructose:

To obtain the second valuable product, the high-inulin phase can preferably be heated. The temperature should be at least at such a level that the polysaccharide chains of the inulin are cleaved to form fructose, which is soluble in a water phase.

In the case of a high concentration of fructose in the water phase, inulin cleavage may also occur only in part or not at all; instead, the inulin itself may go into solution and be separated as valuable product from the water phase by fractionated precipitation or fractionated crystallization.

Further organic solids, for example cellulose, which are present in the high-inulin low-rubber phase do not go into solution with this treatment, but can be separated as a sludge-type solid phase.

This is preferably done in step D by a second separation:

D) Second separation of the high-inulin low-rubber phase into a high-fructose phase, more particularly into a high-fructose aqueous phase, and into a low-fructose solid phase, wherein the high-fructose phase is a second valuable product or a second valuable product is obtained from the high-fructose phase.

The second valuable product is thus fructose or inulin or a mixture of both in dissolved form or as solids.

The method is, as a result of the obtaining of the second valuable product, substantially more economical and is suitable for mass production.

According to the invention, at least step A), but preferably also step B), is carried out at a temperature below 40° C.

This prevents as far as possible the degradation of inulin by plant-endogenous enzymes.

In particular, the plant-component processing according to step A) and the separation according to step B) is done without enzyme addition. Without enzyme addition means that, although the unavoidable plant-endogenous enzymes are present, no additional enzymes are added for the disruption of the plants.

As a result, what is also prevented is inulin degrading at the wrong time and that this form of disruption is also less contaminating for the wastewater, i.e., both the pressed-out water and the water arising at another point in the process.

Apart from the addition of water and/or inorganic salt, more particularly sodium chloride, steps A) and B) are preferably done solely by mechanical means. Thus, there is also no use of organic chemicals, meaning that the water which arises is only slightly chemically or biologically contaminated.

Preferably, the slurry retains in this connection a liquid consistency and is not frozen. Accordingly, the temperature, i.e., the processing temperature, must be selected such that the slurry remains flowable. The separation of a flowable slurry is thus done in step B).

The comminution and additional squeezing of the dandelion plant components can advantageously be done such that rubber particles are released from the dandelion plant components and that inulin overwhelmingly remains in the plant cells of the dandelion plant components.

To this end, the comminution should not be done into excessively small pieces, but should be done sufficiently thoroughly for the rubber to be released in the form of rubber particles which float on the slurry. An excessively strong comminution would make it difficult to obtain the rubber.

The comminution of the dandelion plant components can advantageously encompass grinding to form the slurry, more particularly a suspension, in which the dandelion plant components having a mean diameter of between 2 to 10 mm, preferably 3 to 6 mm, are suspended in water. The addition of water can be done before, during and/or after the comminution and/or squeezing.

Moreover, the comminution of the dandelion plant components can advantageously encompass at least one precomminution, which is done before the grinding and in which the dandelion plant components are comminuted to a mean diameter of between 9 to 21 mm.

The precomminution and the subsequent grinding and/or squashing allow a greater homogeneity of the comminuted plant components in the slurry. The grinding and/or squashing can usually be done with a bead mill or ball mill.

Particularly preferably, one or more hammer mills can be used for the precomminution and/or for the grinding and/or squashing. Particularly preferably, a combination of one or more hammer mills and one or more hammer mills are used for the two aforementioned method steps.

Particularly preferably, one or more hammer mills and one or more ball mills can be used for the precomminution and/or grinding and/or squashing.

Water can advantageously be added in the grinding and/or squeezing and/or in the precomminution. Particularly preferably, the water is added to the plant components in a ratio of from 1 to 10 to 1 to 20.

In the case of this addition of water, the water can advantageously have a neutral pH or, particularly preferably, an acidic pH, more particularly a pH of between pH=3 and 7.

To reduce the tendency toward fermentation, for example owing to plant-endogenous enzymes, the added water can comprise at least one sulfide compound and/or one monochloramine compound. The preferred concentration of the sulfide compound and/or monochloramine compound in the added water is between 0.01 and 0.1 mol/L.

Alternatively or additionally, it is possible to do the aforementioned treatment in the completely or virtually fermentation-free state by means of physical methods. Besides the removal of dispersed solids by means of filters or centrifuges, said physical methods also encompass treatment with ozone and/or UV light.

Thus, the slurry and/or the high-inulin low-rubber phase can advantageously be treated with ozone or UV irradiation, more particularly by means of UV light in the normal pressure range or medium pressure range, in order to lower the tendency of the slurry or the high-inulin phase toward fermentation.

In the first separation of the slurry according to step B, what may advantageously be formed is a water phase comprising, for example, the water added in the grinding and/or precomminution and, additionally, further dissolved substances of the dandelion plant.

Said water phase can be removed
i) together with the high-inulin low-rubber phase;
ii) together with the high-rubber low-inulin phase; or
iii) separately from the phases, e.g., after a treatment in a three-phase decanter.

The aforementioned removed water phase can advantageously be reused, more particularly recycled for the formation of the slurry in step A).

Depending on how far the fermentation has progressed, the aforementioned water phase may also already comprise a proportion of fructose. However, inulin arises predominantly or even virtually completely in the high-inulin low-rubber phase, which is typically heavier than the water phase and consists overwhelmingly or entirely of organic solids.

The first separation of the slurry can advantageously be done as a single or repeated centrifugal separation, preferably in a solid bowl centrifuge.

If the water phase is removed together with the high-rubber low-inulin phase, a separation between the two phases can advantageously be done by means of sieving, with the result that the water phase and the high-rubber low-inulin phase are removed separately.

If the water phase is removed together with the low-rubber high-inulin phase, what can advantageously be done to separate the two phases is a third separation which, in terms of time, takes place before the second separation, wherein said third separation encompasses a single or repeated separation, preferably with a sieve, with the result that the water phase and the low-rubber high-inulin phase are removed separately.

The separately removed water phase, which arises in a three-phase separation in the first separation or by sieving or after the third separation, can advantageously be recycled for addition to the dandelion plant components in the comminution, more particularly in the precomminution and/or in the grinding. This saves the use of chemicals for water stabilization and lowers the level of wastes to be disposed.

The high-inulin viscous phase must again be diluted with water before or during the heating in step C). Said water, too, should have a neutral pH or preferably an acidic pH. Owing to the added water, the fructose obtained from inulin can be separated more efficiently from the remaining solids and transferred into the aqueous phase.

The aqueous phase can advantageously be reused. More particularly, it can be recycled into step A).

The process, up to and including step B), is usually carried out at temperatures less than or equal to ambient temperature or room temperature. It is advantageous when the high-inulin viscous phase is heated at least to 55° C., preferably to 60 to 100° C., in the case of the heating in step C).

The first valuable product can advantageously be obtained as purified rubber from the high-rubber low-inulin phase by washing with water, with or without heating, more particularly to temperatures of between 70-100° C.

The second valuable product can be obtained from the high-fructose phase by crystallization, wherein the second valuable product is inulin and/or fructose.

To prevent a fermentation by enzymes, the processing after the formation of the slurry in step A) should be done relatively rapidly.

The first separation according to step B) can advantageously be done within less than 30 minutes, more particularly within less than 10 minutes, after step A) has been completed.

The first separation according to step B) and the heating according to step C) can advantageously be done within less than 40 minutes, more particularly within less than 15 minutes, after step A) has been completed.

It is particularly advantageous when the first separation according to step B), the heating according to step C) and the second separation according to step D) is done within less than 50 minutes, more particularly within less than 20 minutes, after step A), i.e., the formation of the slurry, has been completed.

Advantageously, water can be added before or after the precomminution and/or the grinding and/or squashing of the dandelion plant components, and the water can be pressed out before the first separation to obtain an inulin syrup.

The remaining solids after the press-out can preferably be resuspended with addition of water to form a slurry.

During the formation of the slurry according to step A) or after the formation of the slurry, but before the first separation, a salt, more particularly sodium chloride, can advantageously be added as solid or solution for the agglomeration of rubber particles.

Water can be added before or after the precomminution and/or the grinding and/or squashing of the dandelion plant components, and the water can be pressed out before the first separation to obtain an inulin syrup and/or inulin press water.

The remaining solids after the press-out can be resuspended with addition of water to form a slurry.

The method will be more particularly elucidated below on the basis of multiple exemplary embodiments and with the aid of the accompanying figures, where:

Figure 1:
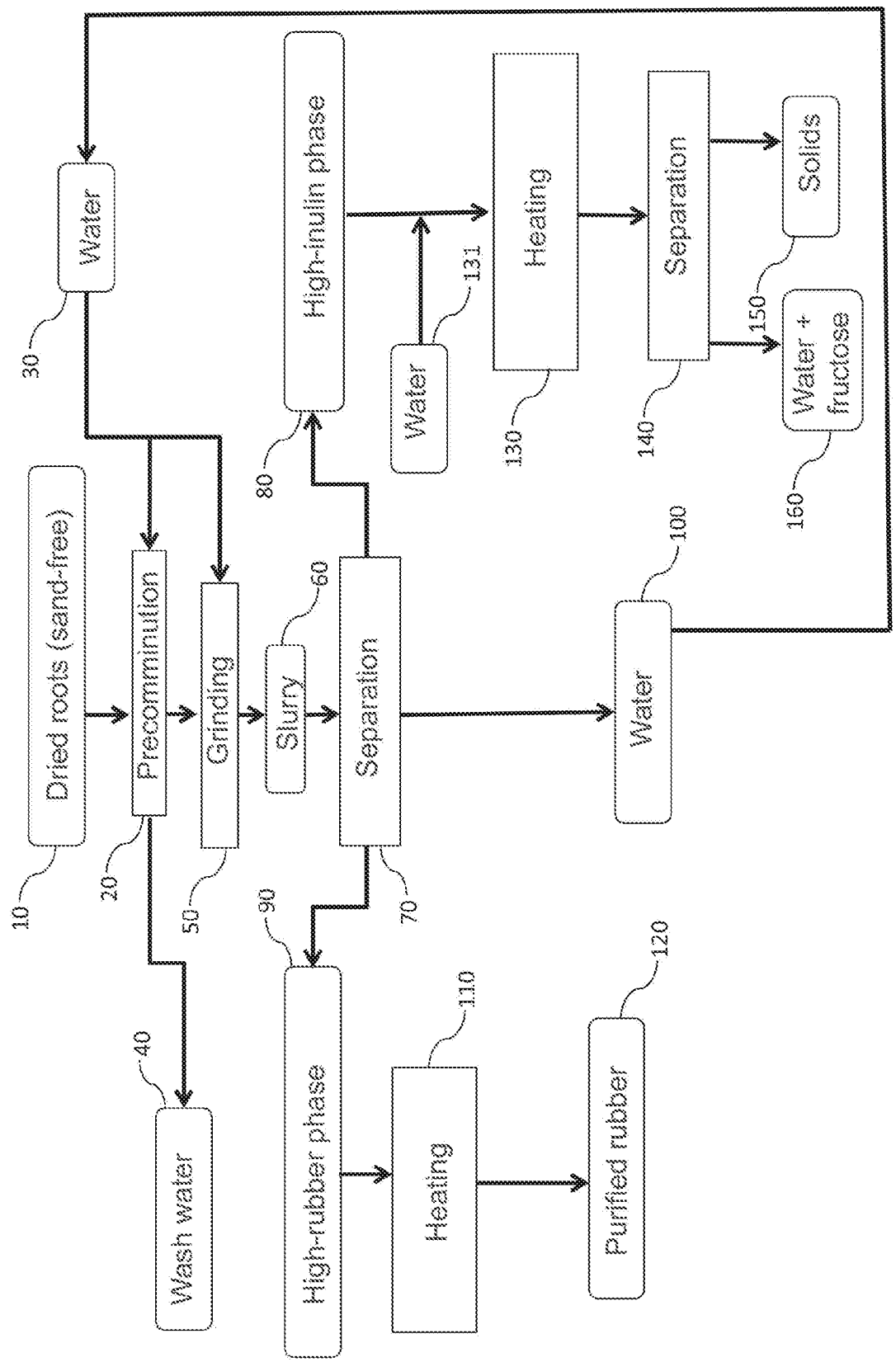
FIG. 1 shows a first variant of the method according to the invention, wherein rubber as first valuable product and inulin or fructose as second valuable product is obtained from dandelion.

FIG. 1 shows a first variant of a method according to the invention. One of the valuable products obtained is a rubber which is also known as dandelion rubber. The other valuable product is either inulin or fructose. Said valuable product can be present in a water-dissolved state, for example as sugar molasses, or as a solid.

The method according to the invention starts from plant components, more particularly from roots, of the dandelion 10 of the species "*Taraxacum kok-saghyz*". The roots have already been cleared of sand by means of preparation steps such as washing and brushing.

In a first processing step, what takes place is a precomminution 20. For this purpose, it is possible to provide a hammer mill or multiple serially connected hammer mills and at least, in each case, one perforated plate and/or at least one sieve having a predetermined hole diameter or a predetermined mesh size. The plant components are pressed through the perforated plate and/or the sieve by the hammer mill. When using the hammer mill, the granulometric distribution of the particles which have passed through satisfy approximately the Gaussian normal distribution. After this first stage in the first step, the mean particle diameter of the plant components is preferably between 1 and 5 cm, preferably 2-3 cm. Excessively small plant components lead to small rubber particles having an excessively low degree of polymerization. Chopping is possible, too, and can be used as part of the precomminution.

What subsequently takes place in the second step is a finer grinding and/or squashing 50 of the comminuted plant components. In the second comminution step, water 30 can likewise be added. In comparison with the precomminution, said grinding and/or squashing corresponds more to a squeezing of the plant components. In the context of the present invention, this is also referred to as squash-grinding. This can, for example, be done in a ball mill or bead mill, more particularly with use of further perforated plates and/or sieves. They preferably have a smaller hole width or mesh size than the perforated plates and/or sieves used in the precomminution 20. The mean particle diameter of the rubber-free organic plant components suspended in the slurry is, in this case, from 0.2 to 1.0 cm, more particularly 0.3 to 0.6 cm.

Since the particles or plant particles formed are unevenly formed particles, the mean particle diameter encompasses the mean value of all diameters which run through the center of gravity of a particle. Then, all these mean values for the respective particles in a particular volume segment are added up and divided by the number of particles in the particular volume segment. This yields the mean particle diameter. This value can be determined by means of optical measurement methods.

The water added in the first step 20 and in the second step 50 is preferably, based on % by weight, 5 to 20 times the cut-up plant components.

The water added can preferably be stabilized with sulfides or monochloramine for the maintenance of a fermentation-free state. Alternatively or additionally, the stabilization can also be achieved by means of a physical method. Besides the removal of dispersed solids by means of filters and centrifuges, such a physical method can also comprise a treatment with ozone or ultraviolet light of a slurry 60 formed by the comminution or high-inulin phase 80 or 80' separated therefrom. The UV light is preferably used at a normal or medium pressure range at an intensity of at least 0.5 watt per liter of fluid.

Likewise, the water added can have a sugar content, more particularly an initial fructose content of more than 1% by weight, especially when the water is recirculated.

As a result of the grinding and/or squashing, the plant components can be comminuted only to the extent that the rubber is released from the plant components and the majority of inulin remains in the plant cells. Thus, the slurry 60 formed comprises water-dispersed organic solids which can sediment and rubber particles or rubber pellets which float on the water.

Preferably, the grinding and/or squashing 50 and/or the precomminution 20 is done at temperatures of below 30° C., preferably at below 25° C.

Likewise preferably, the plant components/water mixture has, in the case of the precomminution 20 and/or grinding and/or squashing 50, a neutral/or acidic pH.

The slurry 60 is then, in a third step of the method variant described in FIG. 1, divided by a first separation 70 into a low-rubber, high-inulin phase 80, into a high-rubber, low-inulin phase 90 and into an aqueous low-inulin and low-rubber phase 100.

The low-rubber, high-inulin phase 80 is substantially an organic solid phase which is heavier than the aqueous phase 100.

The aforementioned low-rubber high-inulin phase has a dry matter content of preferably 8-12%.

The high-rubber, low-inulin phase 90 is substantially a rubber-type solid phase which is lighter than the aqueous phase 100.

The first separation 70 can, for example and preferably, be done by means of a three-phase decanter, with transport of the high-inulin phase 80 into a first direction and the second high-rubber phase 90 into a second direction.

The aqueous phase 100 obtained usually has a certain proportion of fructose and can be recycled as water 30 for addition to the plant components in the method, usually in the precomminution 20 and/or the grinding 50.

The high-rubber, low-inulin and/or low-fructose phase 90 can be sold as is as first valuable product, as so-called crude rubber.

However, it is also possible to heat the high-rubber phase 90, including after an enzymatic intermediate treatment for the degradation of organic compounds, with or without addition of further water in a further "heating" step 110, more particularly at temperatures of between 70 to 100° C., and to then remove the water, for example by means of sieving. What is ultimately obtained is purified rubber 120 as valuable product.

The high-inulin phase 80 is heated, with or without addition of water 131. Said phase 80 is preferably diluted with water to a dry matter content of approx. 5-15% by weight, preferably 8-12% by weight.

The high-inulin phase 80 is heated to a temperature of preferably from 60 to 100° C. As a result of the heating 130, the majority of the inulin is converted into fructose and thereby goes into solution, whereas other organic constituents, for example cellulose or proteins, remain as solids.

The high-inulin and/or high-fructose phase 80 is, in this connection, pH-neutral or acidic.

The heating is followed by a second separation 140, for example by means of filtration or by means of centrifugal separation.

The heating 130 of the high-inulin or high-fructose phase 80 and the second separation 140 can immediately follow the first separation 70 and can preferably be initiated within less than 30 minutes, particularly preferably within less than 10 minutes, after the first separation 70. This preempts an enzymatic degradation as part of a fermentation.

Particularly preferably, the two steps "heating" and "separation" 130 and 140 are completed within less than 30 minutes, more particularly within 10 minutes.

After the separation 140, there is an organic low-fructose solid phase 150 containing, for example, cellulose and further poorly water-soluble plant ingredients.

Moreover, there is a high-fructose aqueous phase 160. It can be sold as is as second valuable product, as a sugar solution without separate isolation of the fructose. The sugar solution can, moreover, also contain further monosaccharides or disaccharides, for example glucose. However, the proportion by weight of these saccharides in solution is, compared to the proportion of fructose, advantageously less than 10%, preferably less than 5%. Alternatively, it is also possible for the fructose, possibly after further purification steps, to be isolated as a solid from the sugar solution, for example by evaporation and crystallization, and to be obtained as second valuable product.

Fructose is a popular sucrose substitute and can be used in a number of ways in the food industry or chemical industry.

Figure 2:
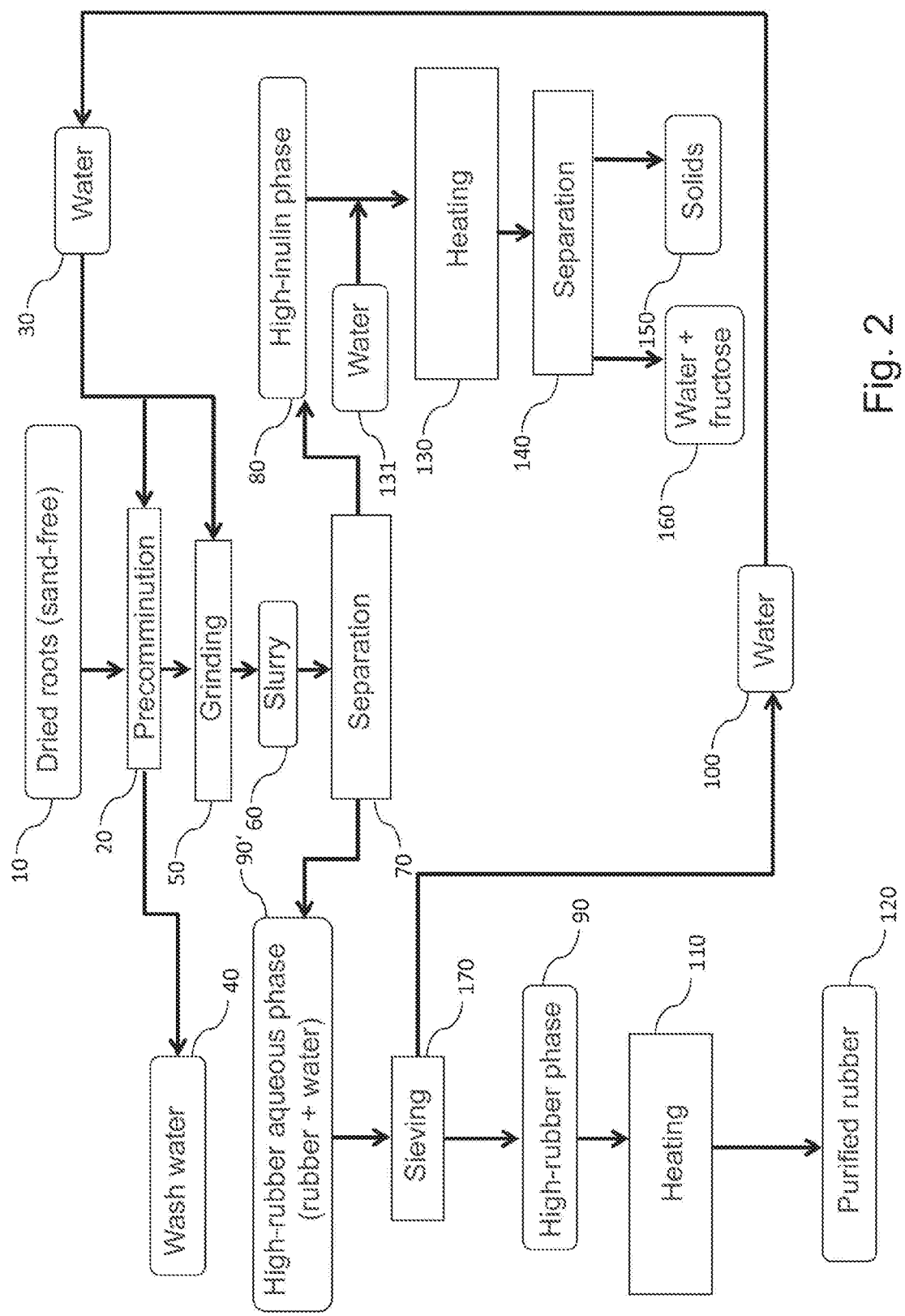
FIG. 2 shows a second variant of a method according to the invention for obtaining rubber and a further valuable product from dandelion.

FIG. 2 shows a second variant of the method according to the invention. The comminution steps 20 and 50, by means of which the slurry 60 is obtained, is analogous to the procedure in FIG. 1.

This is followed by the first separation 70. In this separation, it is possible to use a two-phase decanter or separator, possibly a nozzle separator, which divides the slurry into an aqueous high-rubber and low-inulin phase 90' and into a high-inulin low-rubber phase 80. The aqueous phase 90' is, in this case, water, with or without further dissolved constituents, in which rubber particles or rubber pellets or rubber agglomerates are in a dispersed state.

They can subsequently be removed as a high-rubber solid phase 90, or as crude rubber and thus as first valuable product. This can preferably be done by means of sieving 170. What remains is water 100, which, analogously to the water removed in FIG. 1, can be recycled in the process.

The crude rubber can then, analogously to FIG. 1, be further processed by addition of water and/or heating 110 to yield purified rubber 120.

The high-inulin phase 80, preferably a substantially organic solid phase, can then, analogously to FIG. 1, be processed to yield fructose-containing sugar water 160 or fructose as a solid as second valuable product.

Figure 3:
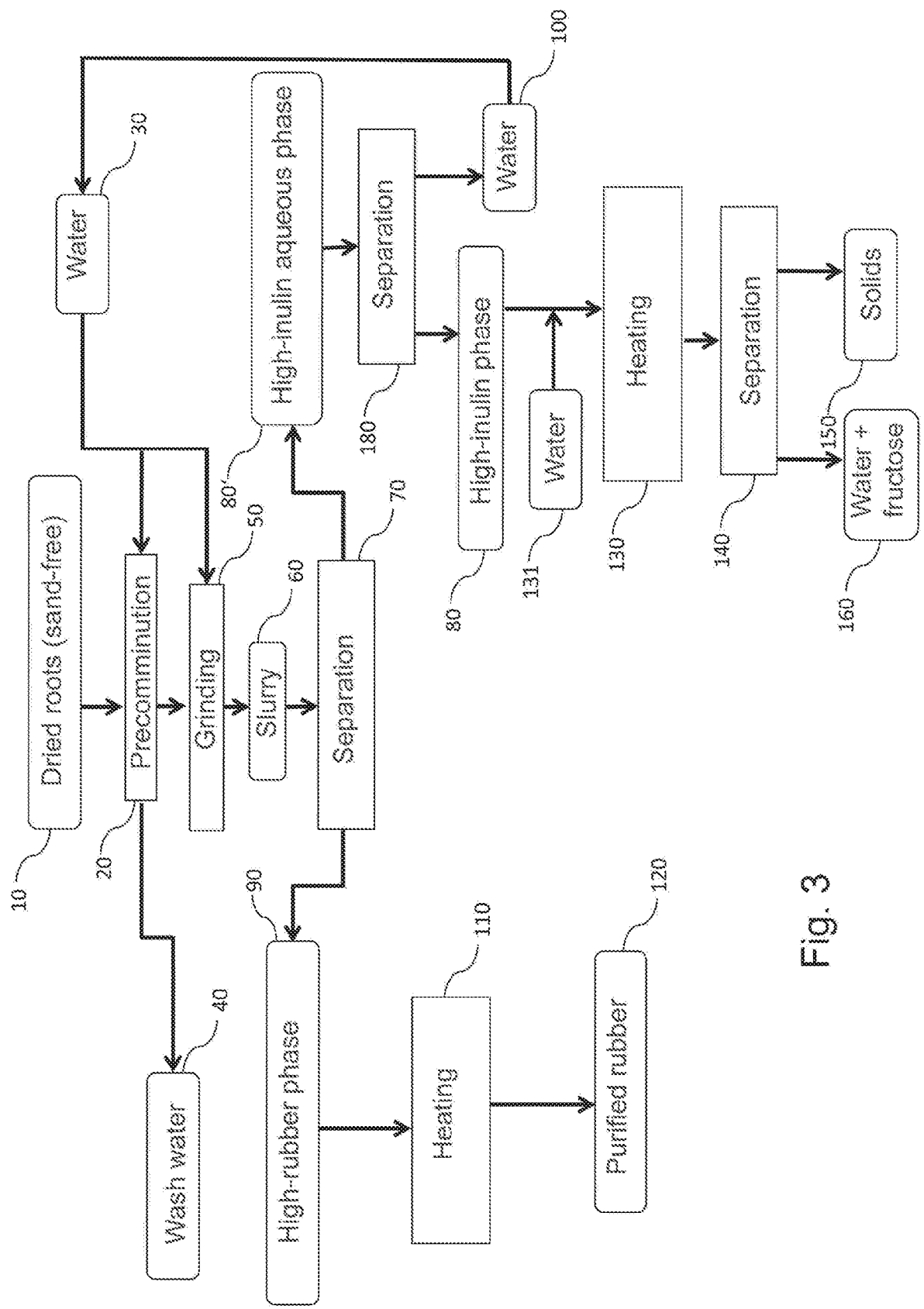
FIG. 3 shows a third variant of a method according to the invention for obtaining rubber and a further valuable product from dandelion.

FIG. 3 shows a third variant of the method according to the invention. The comminution steps 20 and 50, by means of which the slurry 60 is obtained, are likewise analogous to the procedure in FIG. 1.

In the first separation 70, what then takes place is a division of the slurry 60 into a high-rubber and low-inulin and -fructose phase 90 and into an aqueous high-inulin phase 80'. Said separation is usually done by means of sieving. The aqueous phase 80' is, in this case, water containing dissolved and dispersed organic constituents, for example cellulose, proteins or inulin.

The high-rubber and low-inulin phase 90 is in this case, analogously to FIG. 1, the crude rubber, which can be utilized as valuable product or can be further processed to yield purified rubber 120.

The aqueous high-inulin phase 80' is then divided in a third separation 180, which in terms of time takes place before the second separation 140 carried out analogously to FIG. 1, into an aqueous low-inulin phase 100 and into a high-inulin phase 80 which is substantially a solid phase.

Said third separation 180 should be done coldly, i.e., at temperatures of less than 30° C., preferably less than 25° C. A separation in the centrifugal field of a separator is recommended. Moreover, said third separation 180 can immediately follow the first separation 70 and be initiated preferably within less than 30 minutes, particularly preferably within less than 10 minutes, after the first separation 70. This preempts an enzymatic degradation, which would convert the inulin into fructose.

What is then added to the high-inulin phase 80, the specific heavy phase, is water 131; a dispersion is formed again. Thereafter, the high-inulin phase 80 is subjected to the follow-up steps in an analogous manner to FIG. 1. i.e., the heating and a further separation, in this case a second separation. Thus, what can be obtained, analogously to FIG. 1, is fructose-containing water 160 or fructose as a solid as second valuable product.

In all the described variants of FIGS. 1-3, the first separation should preferably be done immediately after the grinding 50, and should thus be initiated within a period of less than 30 minutes, preferably of less than 10 minutes, after the grinding 50.

For the separation 70 of the slurry 60 into the high-rubber, possibly aqueous, phase 90 and into the high-inulin and/or high-fructose phase 80, a decanter can preferably be used. The optimum number of revolutions for a separation with the decanter are 3000 to 4500 (rpm) revolutions per minute. Also possible is the use of a separator having an acceleration of approx. 12 000×g. For the embodiment according to FIG. 3, a sieve or filter is used in order to separate the aqueous high-inulin phase from the rubber.

For the separation of the high-inulin aqueous phase 80, solid bowl centrifuges, disk separators or nozzle separators are used.

In one variant of the method that is not depicted, inulin can be obtained as alternative valuable product. This is especially the case when the water added before the second and/or third separation has an elevated fructose content, meaning that the inulin degradation during the dissolution of the inulin in the water occurs at least only in part. The inulin can then be precipitated as valuable substance or remain in solution.

The water 100 which is obtained after the first and/or second separation in FIGS. 1-3 and which can then be recycled in the method has a dry matter content of less than 1% by weight and a yellowish brown to black color. It can be used multiple times.

Inulin can preferably be used as thickener, for example in the food industry or cosmetics industry.

The water recovered in the separation can have a dry matter content of less than 1%.

Figure 4:
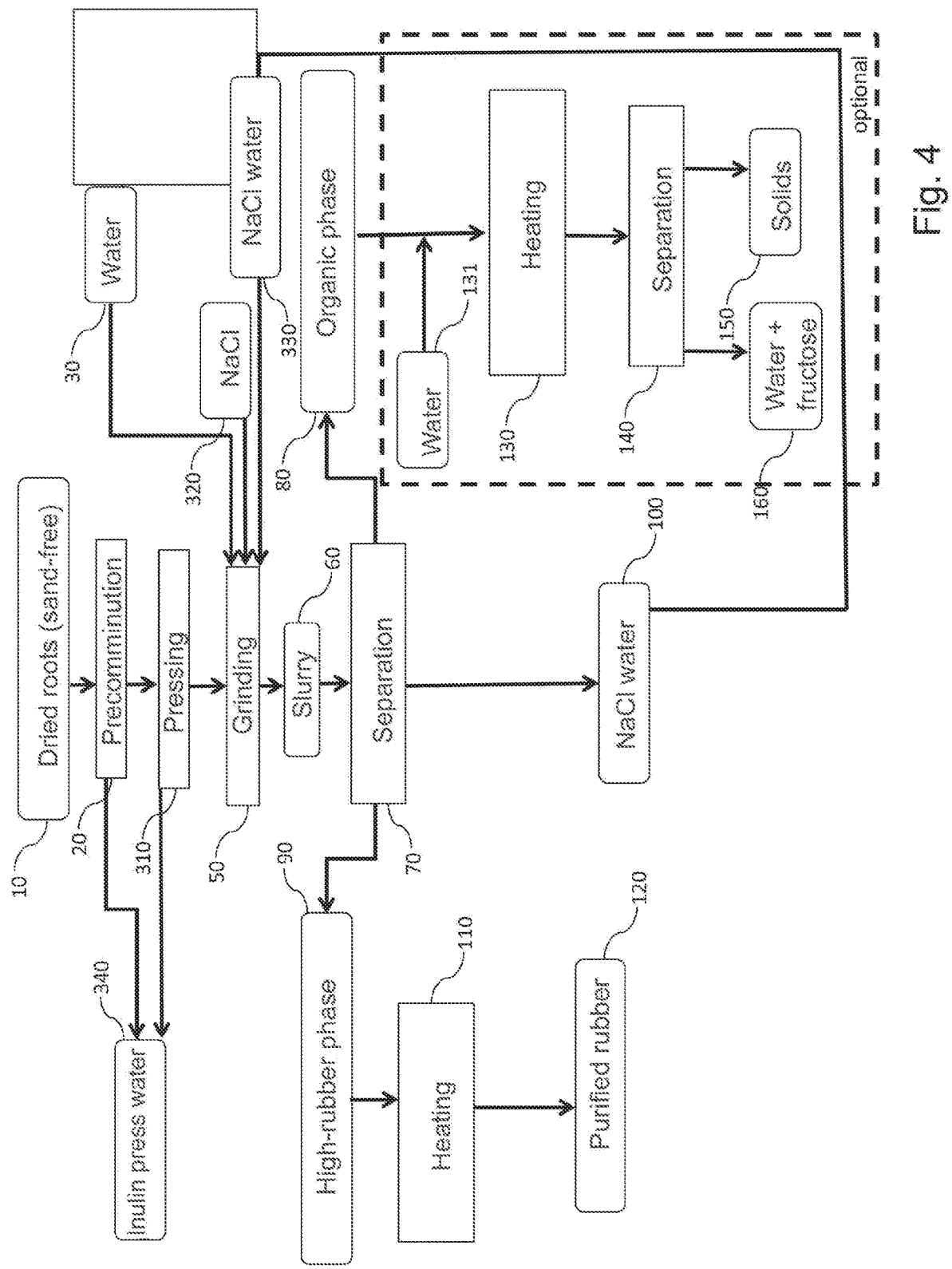
FIG. 4 shows a fourth variant of a method according to the invention for obtaining rubber and a further valuable product from dandelion.

The variant of a method according to the invention that is depicted in FIG. 4 has a few modifications compared to FIGS. 1-3. In said variant, the dandelion material precomminuted with fresh water is first pressed by means of pressing 310 during or after a precomminution operation. In said operation, some of the inulin passes into the pressed-out water and what is formed is a so-called inulin press water 340 in which gel-type inulin and water are mixed together.

The result is a kind of inulin syrup which has not yet been converted into fructose, since it was obtained without a heating step.

Then, the pressed granular root material is resuspended with water to form a slurry. The suspension can then be comminuted in one or more passes in the ball mill.

Since some of the inulin has already been obtained by the press-out operation, the obtaining of further inulin by a second separation operation can be advantageously omitted or optionally carried out. For this purpose, the inulin content in the pressed-out water and in the slurry can be ascertained in order to assess whether further obtaining in an analogous manner to FIGS. 1-3 is still economically viable.

For better agglomeration of the rubber particles, it is possible in the variant of FIG. 4, but also in the variants of FIGS. 1-3, to add a salt, more particularly sodium chloride 320. Alternatively, it is also directly possible to add salt water 330 in the formation of the slurry. However, the addition is preferably done immediately before the ball mill and, particularly preferably, only after the removal of the inulin syrup in FIG. 4. Preferably, the sodium chloride can be 1-3% by weight of sodium chloride, based on the slurry mass. The electrical conductivity is thereby altered and the rubber which is comminuted by the ball mill and which preferably has a particle size of below 0.5 mm can agglomerate to form larger rubber nodules and can thus be sieved out more efficiently.

The salt water 330, also called electrolyte water, can be recycled or recirculated.

Some specific examples are mentioned below, which are, however, not to be understood as limiting with respect to the aforementioned variants. Unless otherwise indicated, the percentages in the examples refer to percent by mass.

EXAMPLE 1

300 g of roots having a dry matter content of 25% were comminuted using the Thermomix with addition of, altogether. 2070 g of water in, altogether, 6 intervals of 20 seconds at level 7. One third thereof is diluted with one part water (sample A), a further third was diluted with 2 parts water (sample B) and a third third was diluted with three parts water (sample C).

Each of these samples was finely ground using the Labstar laboratory ball mill from Netzsch.

The result of the spin test, 2 min at 6000 rpm (4500 g), first run:

Sample A exhibited a flotate layer. 7%, with free rubber below the flotate, a dark-brown water phase and 22% solid.

Sample B exhibited 5% as a compact flotate with integrated rubber, a medium-brown water phase and 22% solid.

Sample C exhibited 4% as a compact flotate with integrated rubber, a light-brown water phase and 26% solid.

After the second run, the water phase lightened in each case; the flotate phase was reduced to 2% sample A, 3% sample B and 3% sample C. Likewise, the proportion of solid phase decreased to 17% (sample A), 15% (sample B) and 19% (sample C).

After the third run, the water phase lightened further in each case: the flotate phase was 3% sample A, 2% sample B and 2% sample C. Likewise, the proportion of solid phase decreased to 14% (sample A), 13% (sample B) and 12% (sample C).

EXAMPLE 2

100 g of dried roots were soaked in water at approx. 22° C. for 40 min and then weighed out. The wet weight thereof was 266 g (dry matter=406%). Together with further water and further wet roots (obtained by swelling from an additional proportion of root dry mass of 100 g) having the total amount of 200 g of root dry mass and 1872 g of water, comminution was carried out in two batches using the Thermomix in, altogether, 4 intervals of 15 seconds at level 9. By means of draining with shaking using a kitchen sieve, 430 g of water with approx. 3° Brix were obtained. The inulin water removed was replaced with fresh water and the total amount was then diluted with 2 parts water. This suspension was finely ground in 3 passages using a Labstar ball mill from Netzsch.

Result of the spin test, 2 min at 6000 rpm (4500 g), first run:

The Sample exhibited a small flotate layer with 0.5% of a dark-brown water phase and 10% solid. After the second run, the water phase lightened in each case: the flotate phase was increased to 1%, consisting of light rubber particles. The solid phase occupied 16%. After the third run, the water phase lightened further in each case: the flotate phase was 1% as dark rubber-containing flotate. The heavy solid phase was 16%.

EXAMPLE 3

40 kg of dried roots were cleaned of sand and impurities and then ground in a hammer mill (from Netzsch, hole width 15 mm) with addition of water to an extent of, altogether, 180 kg with 17.2 kg of dry matter content. The dispersion water after the grinding had on average 3° Brix. With addition of water in the ratio of 1+1, further comminution was carried out with a hammer mill of 5 mm hole width. The result was a dispersion amount of 359 kg, with 2.4° Brix in the fluid fraction.

This dispersion was ground with addition of 60 kg of water using a ball mill from Netzsch and a throughput of 200 kg/h. This operation was repeated again without further addition of water.

The finely ground dispersion was diluted with 100 kg of water and pumped into a separating decanter from GEA, model CA 226. Only approx. 50 g of rubber were outputted with the water phase and separated from the water using a vibratory sieve. The solid with 15.33% dry matter and visible rubber amounts and the liquid with 1.1% solid were mixed again and, after 3 weeks, resuspended in two parts of 129 kg and 148 kg with 80 kg of water in each case. 2% salt was added. Altogether 2.8 kg of wet rubber were outputted with the water phase and separated from the water using a vibratory sieve (mesh size 500 µm).

After drying and washing, this yielded approx. 500 g of rubber dry mass.

REFERENCE SIGNS

10 plant components
20 precomminution
30 water
40 wash water
50 grinding
60 slurry
70 first separation
80 high-inulin phase
80' high-inulin aqueous phase
90 high-rubber phase
90' high-rubber aqueous phase
100 water phase
110 heating
120 purified rubber
130 heating
131 water
140 second separation
150 low-fructose solids
160 high-fructose phase
170 sieving
180 third separation
310 pressing
320 sodium chloride
330 salt water
340 inulin press water

What is claimed is:

1. A method for processing dandelion plant components (10), wherein obtaining of rubber as a first valuable product is achieved in the method and is characterized by the following steps:

A) comminution and/or squeezing of the dandelion plant components (10), wherein the dandelion plant components (10) are dried dandelion roots from the species *Taraxacum kok-saghyz*, preferably with addition of water (30), to form a slurry (60), in which slurry the dandelion plant components (10) are suspended in water with a mean diameter of between 2 to 10 mm;

wherein the comminution of the dandelion plant components (10) encompasses at least one precomminution (20) and a grinding and/or squashing (50), wherein the water (30) is added to an extent of from 5 to 20 parts, based on the weight of the plant components, and wherein the water has a neutral pH or an acidic pH, and wherein water is added before or after the precomminution (20) of the dandelion plant components (10), and the water is pressed out before the grinding and/or squashing to obtain an inulin syrup and/or inulin press water (340), wherein the inulin syrup and/or inulin press water is removed, and wherein the remaining solids after the press-out are re-suspended with addition of fresh water to form a slurry, B) first separation (70) of the slurry (60) into at least one high-inulin low-rubber phase (80, 80') and at least one high-rubber low-inulin phase (90, 90'), wherein the first separation (70) is done by a two-phase decanter or separator, wherein the high-rubber low-inulin phase (90, 90') forms the first valuable product or the first valuable product is obtained from the high-rubber low-inulin phase (90, 90'), wherein at least step A) is done at a temperature of less than 40° C., and wherein steps A) and B) are done without enzyme addition.

2. The method as claimed in claim 1, characterized in that, apart from the addition of water and salt, steps A) and B) are done solely by mechanical means.

3. The method as claimed in claim 1, characterized in that step A) and step B) are done at a temperature of less than 40° C.

4. The method as claimed in claim 1, characterized in that it further comprises a step C), obtaining of sugar from the high-inulin low-rubber phase (80, 80') from step B is done by heating (130) of the high-inulin low-rubber phase (80, 80') to a temperature at which at least some inulin is converted into fructose.

5. The method as claimed in claim 4, characterized in that it further comprises a step a step D), conducting a second separation (140) of the high-inulin and/or -fructose low-rubber phase (80, 80') according to step C) in claim 4 into a high-fructose phase (160) and into a low-fructose solid phase (150), wherein the high-fructose phase (160) is a second valuable product or a second valuable product is obtained from the high-fructose phase.

6. The method as claimed in claim 5, characterized in that the second valuable product is obtained from the high-fructose phase (160) by crystallization, wherein the second valuable product is inulin and/or fructose.

7. The method as claimed in claim 5, characterized in that the first separation (70) according to step B), the heating (130) according to step C), and the second separation (140) according to step D) are done within less than 50 minutes after step A) has been completed.

8. The method as claimed in claim 4, characterized in that the first separation (70) according to step B) and the heating (130) according to step C) are done within less than 40 minutes after step A has been completed.

9. The method as claimed in claim 1, characterized in that the comminution of the dandelion plant components (10) is done such that rubber particles are released from the dandelion plant components and that inulin overwhelmingly remains in the plant cells of the dandelion plant components (10).

10. The method as claimed in claim 1, wherein the dandelion plant components that are suspended in water have a mean diameter of between 3 to 6 mm.

11. The method as claimed in claim 1, wherein in the at least one precomminution (20), the dandelion plant components are comminuted to a mean diameter of between 10 to 50 mm.

12. The method as claimed in claim 1, characterized in that the water (30) that is added in the grinding and/or squashing (50) and/or in the precomminution (20), pH of between pH=3 and 7.

13. The method as claimed in claim 1, characterized in that the water (30) added comprises at least one sulfide compound and/or one monochloramine compound for the maintenance of a fermentation-free state.

14. The method as claimed in claim 1, characterized in that, in the first separation (70) of the slurry (60), what is formed is an aqueous phase (100) which is removed
together with the high-inulin low-rubber phase (80);
together with the high-rubber low-inulin phase (90); or
or separately from the phases (80, 90).

15. The method as claimed in claim 14, characterized in that the first separation (70) of the slurry (60) encompasses a single or repeated centrifugal separation, preferably in a decanter or separator.

16. The method as claimed in claim 14, characterized in that, if the aqueous phase (100) is removed together with the high-rubber low-inulin phase (90) as aqueous high-rubber low-inulin phase (90'), a separation between the two phases 100, 90) is done by means of sieving (170), with the result that the aqueous phase (100) and the high-rubber low-inulin phase (90) are removed separately.

17. The method as claimed in claim 14, characterized in that, if the aqueous phase (100) is removed together with the low-rubber high-inulin phase (80) as aqueous low-rubber high-inulin phase (80'), what is done to separate the two phases (100, 80) is a third separation (180), wherein said third separation (180) encompasses a single or repeated centrifugal separation, preferably in a separator, with the result that the aqueous phase (100) and the low-rubber high-inulin phase (80) are removed separately.

18. The method as claimed in claim 14, characterized in that the separately removed aqueous phase (100) is recycled for addition to the dandelion plant components (10) in the comminution.

19. The method as claimed in claim 14, characterized in that the aqueous phase (100) is reused.

20. The method as claimed in claim 14, characterized in that the high-inulin low-rubber phase (80) is diluted with water (131) before or during a step C), obtaining of sugar from the high-inulin low-rubber phase (80, 80') from step B, comprising heating (130) of the high-inulin low-rubber phase (80, 80') to a temperature at which at least some inulin is converted into fructose.

21. The method as claimed in claim 14, characterized in that the water phase (100) is treated with ozone or UV irradiation for the maintenance of a fermentation-free state.

22. The method as claimed in claim 14, characterized in that the high-inulin low-rubber phase (80) is heated in a step C), obtaining of sugar from the high-inulin low-inulin phase (80, 80') from step B, to a temperature of at least to 55° C.

23. The method as claimed in claim 1, characterized in that one or more hammer mills and/or one or more ball mills are used for the precomminution (20) and/or grinding and/or squashing.

24. The method as claimed in claim 1, characterized in that the first valuable product is obtained as purified rubber (120) from the high-rubber low-inulin phase (90) by washing with water, with or without heating (110).

25. The method as claimed in claim 1, characterized in that the first separation (70) according to step B) is done within less than 30 minutes after step A) has been completed.

26. The method as claimed in claim 1, characterized in that, during the formation of the slurry according to step A) or after the formation of the slurry, but before the first separation (70), a salt is added as solid or solution for the agglomeration of rubber particles.

* * * * *